United States Patent [19]

Schwindeman et al.

[11] Patent Number: 5,486,343
[45] Date of Patent: Jan. 23, 1996

[54] LITHIUM AMIDE PROCESS

[75] Inventors: James A. Schwindeman, Charlotte; Robert C. Morrison, Gastonia, both of N.C.

[73] Assignee: FMC Corporation, Philadelphia, Pa.

[21] Appl. No.: 232,891

[22] Filed: Apr. 25, 1994

[51] Int. Cl.$^6$ ................................................ C01B 21/00
[52] U.S. Cl. .................................................... 423/413
[58] Field of Search ................................................ 423/413

[56] References Cited

U.S. PATENT DOCUMENTS

| | | | |
|---|---|---|---|
| 2,612,436 | 9/1952 | Overhoff et al. | 423/413 |
| 3,542,512 | 11/1970 | Honeycutt | 423/413 |
| 4,206,191 | 6/1980 | Morrison et al. | 423/413 |

FOREIGN PATENT DOCUMENTS

| | | | |
|---|---|---|---|
| 674976 | 7/1979 | U.S.S.R. | 423/413 |

Primary Examiner—Wayne Langel
Attorney, Agent, or Firm—Charles C. Fellows; Robert L. Andersen

[57] ABSTRACT

A process for the preparation of lithium amide comprising essentially forming lithium bronze by introducing at least 1 equivalent of anhydrous ammonia over a 1 to 5 hour period into a dispersion containing one equivalent of lithium in a liquid hydrocarbon solvent at a temperature of up to 40° C., then after the lithium bronze is formed, heating the reaction mixture to 50° to 80° C. for 2 to four hours to decompose the lithium bronze and form a suspension of lithium amide in the solvent from which suspension the lithium amide is recovered.

7 Claims, No Drawings

LITHIUM AMIDE PROCESS

This invention concerns an improved process for producing lithium amide.

Lithium amide is a strong, inorganic base that is used as a reagent in organic synthesis. There are various high and low temperature known methods available for production of lithium amide. One such process comprises a reaction between gaseous ammonia and molten alkali metal at a temperature above the melting point of amide to be produced, generally a temperature of about 380° C. was employed. Another such process was conducted by dissolving the alkali metal in a liquid ammonia, in the presence of various inorganic materials as catalysts.

A commercially viable, low temperature process for preparing lithium amide was disclosed in U.S. Pat. No. 4,206,191. This process first formed a mixture of bulk lithium and cobalt catalyst in an inert liquid aromatic hydrocarbon at a temperature of 0° to –60° C. Anhydrous liquid ammonia, at least 4 equivalents, was then added with stirring so that the lithium metal dissolves and two immiscible phases form. The cobalt catalyst catalyzed the formation of a so called lithium-ammonia bronze solution which became the top phase and the aromatic hydrocarbon becomes the bottom phase. Lithium amide was then formed by raising the temperature while stirring the reaction mass; to decompose the lithium bronze to form lithium amide while hydrogen and excess ammonia are liberated. The lithium amide separated out in a very finely divided form in the aromatic hydrocarbon solvent. A second addition of ammonia was frequently used to convert all of the lithium metal to lithium amide. The resultant slurry was filtered and the filter cake dried to afford lithium amide contaminated by the catalyst.

The present invention provides a process for producing lithium amide in high yield and purity by reacting lithium metal, in an olefinic or aromatic hydrocarbon solvent, at a temperature of forty degrees centigrade or below with ammonia to form a layer of lithium bronze on the surface of the solvent. After at least one equivalent of ammonia was added to the reaction mixture, it was heated to a temperature between 50° and 80° C. to decompose the lithium bronze to form a gray suspension of the product lithium amide in the solvent. The product was recovered from the reaction solvent, washed several times with a hydrocarbon solvent and dried in a stream of argon gas to afford a free flowing white powder.

Advantages of this process over the prior art are: the process is conducted without a catalyst thus avoiding contaminating the product with a heavy metal catalyst, and avoids the high temperature processes which produced a fused product which had to be ground, not an easy process with a highly reactive, hygroscopic compound. The reaction solvent is easily recovered and can be recycled back into the process without further manipulation. Lower ammonia requirements reduce cost of raw materials and make possible use of smaller equipment for the recovery and recycle of the ammonia thus reducing capital costs.

The olefin solvents useful in practicing this invention contain 2 to 16 carbon atoms, preferably 3 to 8 carbon atoms and include the olefins 1-propene, 1-butene, 1-pentene, 1-hexene, 1-heptene, 1-octene, cyclopropene, cyclobutene, cyclopentene, cyclohexene, cyclooctene and the like. Aromatic solvents useful in practicing this invention include benzene, toluene, xylenes, ethylbenzene, trimethybenzene, propylbenzene, cumene and the like. Unexpectedly, a portion of the solvents are reduced during the reaction; for example, toluene is reduced to dihydrotoluene and 1-hexene to hexane. This helped to absorb the hydrogen generated as a by-product in the formation of the lithium amide from the lithium bronze.

The process can be conducted under a wide variety of operating conditions, including being run under pressure which, for example, is necessary when using the low molecular weight olefins as the reaction solvent.

Lithium metal pieces used in the reaction may be varied widely in size. Lithium may be used as a powder obtained from dispersion processes, as granules sometimes referred to as sand or shot depending on size, and as bulk metal means pieces of any of the commercially available forms of lithium.

Sizes of lithium metal available commercially which can be used are: one inch (2.5 cm) diameter by 8 inch (20.3 cm) long rods, one-half inch (1.3 cm) by 6.5 inch (16.5) long rods, 2.25 inch (5.7 cm) by 3.38 inch (8.6 cm) long cylindrical ingots [¼ lb.], 3 inch (7.6 cm) diameter by 3.8 inch (9.7 cm) long cylindrical ingots [½ lb (227 g)], 4 inch (10.2 cm) diameter by 5 (12.7 cm) inch long cylindrical ingots [1 lb (454 g)], and two pound (908 g) trapezoidal ingots having dimensions of 2.5/3.5 inches (6.4/8.9 cm) in width by 3.25 inches (8.3 cm) in height by 10.5 inches (26.7 cm) in length, as well as lithium metal dispersion, 30 weight percent in mineral oil with 90% of the particles greater than 10 microns, but less than 50 microns, (average: 20 microns). Dispersions are typically washed several times with hydrocarbon solvents to remove the oil in which the dispersion was produced and the hydrocarbon separated from the lithium which is dried in an inert atmosphere to produce a powder having particle sizes between 10 and 300 microns.

Anhydrous ammonia is used in amounts of 1 to 10, or more, equivalents per equivalent of lithium metal. One to five equivalents of ammonia are preferred and 1 to 3 equivalents most preferred. While ten or more equivalents of ammonia can be employed this does not seem to have a great benefit on conversion and assay and results in a lot of excess ammonia to be recovered and recycled. The method of introducing the ammonia is not critical. The ammonia can be introduced into the reactor above or below the surface of the solvent-lithium phase. Introducing the ammonia below the surface of the solvent-lithium phase provides useful agitation of the reaction mixture.

Heavy metal catalysts are not required with the olefinic or aromatic solvents in the improved process of this invention. This is a very advantageous benefit of the present process since the product is not contaminated with catalyst. Moreover, the product recovered has excellent flow properties when dried and does not have to be ground.

The following experiments further illustrate the invention. All reactions were conducted under an argon atmosphere using anhydrous ammonia.

EXPERIMENTAL

A number of experiments were conducted according to the invention. Lithium metal dispersion was washed free of oil using hexane and dried in a stream of argon after which the dried metal was stored in an argon atmosphere. A 500 milliliter three-necked round bottom flask was fitted with a mechanical stirrer, a gas inlet tube connected to an ammonia cylinder and a Claisen adapter equipped with a thermocouple, a dry ice condenser and an argon inlet. The apparatus was dried overnight at 125° C., assembled hot, and cooled to room temperature in a stream of argon. A portion of the dried lithium metal dispersion, about 7 grams was transferred to the flask with about 200 ml of solvent. This suspension was cooled to below –30° C., and at least four equivalents of anhydrous ammonia were added via the gas inlet tube. This afforded a layer of lithium bronze, floating on the surface of the solvent. After all the ammonia had been added, the reaction mixture was heated to 50–80° C., to decompose the lithium bronze. After a few hours of heating the lithium bronze had been consumed, with formation of a gray suspension. This suspension was transferred to a dry filter funnel. The solids were washed twice with 100 milliliter portions of hexane, once with 100 milliliter portions of pentane and then dried in a stream of argon. This afforded a free flowing white powder. Typical yield was 85% and typical assay was 90%. The data from these examples and a comparative example (Experiment 8088) are listed in the table.

form a suspension of lithium amide in the solvent from which suspension the lithium amide is recovered.

2. The process of claim 1 wherein the lithium amide is recovered by filtering the reaction mixture, drying the separated lithium amide with a stream of an inert gas and recovering lithium amide in the form of a free flowing white powder.

3. The processes of claim 1 wherein liquid the hydrocarbon solvent is an olefin selected from the group consisting of 1-propene, 1-butene, 1-pentene, 1-hexene, 1-heptene, 1-octene, cyclopropene,, cyclobutene, cyclopentene, cyclohexene, and cyclooctene.

4. The process of claim 1 wherein 1 to 5 equivalents of anhydrous ammonia are introduced into the reaction mixture.

TABLE

| EXPER | EQ. NH3 | NH3 FEED TIME | SOLVENT | CATALYST | HEAT TIME (60 C) | YIELD | ASSAY | COMMENTS |
|---|---|---|---|---|---|---|---|---|
| 8019 | 4.61 | 2 hr 50 min | Toluene | None | 0.75 hr | 96.3 | 95.8 | |
| 8020 | 4.48 | 1.5 hr | Toluene | None | 2.5 hr | 73.1 | 83.1 | |
| 8025 | 4.58 | 1 hr 40 min | Toluene | None | 4 hr | 98.2 | 96.0 | |
| 8032 | 4.93 | 2.0 hr | Toluene | None | 7 hr | 86.5 | 90.0 | CO2 Metal |
| 8043 | 4.14 | 1 hr 52 min | Toluene | None | 2.75 hr | 65.3 | 79.9 | |
| 8045 | 4.92 | 6 hr 10 min | Toluene | None | 2.5 hr | 96.8 | 98.0 | |
| 8054 | 4.78 | 3.0 hr | Toluene | None | 3 hr | 58.1 | 90.8 | Two passes with ammonia |
| 8202 | 4.68 | 2.25 HR | Toluene | None | 1.5 hr | | | |
| | 1.20 | 0.75 HR | | | 1 hr | 93.1 | 97.3 | Two passes with ammonia |
| 8203 | 2.38 | 1.75 hr | Toluene | None | 2.25 hr | 86.5 | 93.1 | |
| 8204 | 2.24 | 1.75 hr | Toluene | None | 2.5 hr | | | |
| | 0.78 | 1 hr | | | 2.75 hr | 90.0 | 97.9 | Two passes with ammonia |
| 8205 | 1.50 | 1.25 hr | Toluene | None | 4.75 hr | | | |
| | 0.43 | 1 hr | | | 2.75 hr | 92.8 | 97.0 | Two passes with ammonia |
| 8218 | 4.35 | 2.75 hr | Xylene | None | 7.25 hr | 90.3 | 94.1 | |
| 8166 | 6.37 | 100 min | 1-Hexene | None | 1.5 hr | 87.1 | 93.8 | |
| 8192 | 5.41 | 140 min | 1-Hexene | None | 1.75 hr | 69.8 | 64.4 | |
| 8194 | 4.77 | 3 hr | 1-Hexene | None | 1 hr | | | Two passes with ammonia |
| | 1.91 | 70 min | | | 1 hr | 89.3 | 94.8 | Solvent evaporated |
| 8193 | 7.04 | 90 min | 1-Octene | None | 5 hr | 87.0 | 85.2 | Three passes with ammonia |
| 8195 | 4.62 | 140 min | 1-Octene | None | 3 hr | | | Two passes with ammonia |
| | 2.72 | 90 min | | | 2.5 hr | 60.3 | 82.3 | Blue |
| 8088 | 4.73 | 1 hr 40 min | Hexane | None | 2 hr | | | Bronze formed, did not convert to amide |

What is claimed is:

1. A process for the preparation of lithium amide consisting essentially of forming lithium bronze by introducing at least one equivalent of anhydrous ammonia over a 1 to 5 hour period into a reaction mixture containing one equivalent of lithium in a liquid hydrocarbon solvent selected from the group consisting of olefins containing 2 to 16 carbon atoms at a temperature of up to 40° C., thenafter the lithium bronze is formed, heating the reaction mixture to 50° to 80° C. for two to four hours to decompose the lithium bronze and 5. The process of claim 1 wherein 1 to 3 equivalents of anhydrous ammonia are introduced into the reaction mixture.

6. The process of claim 1 wherein the lithium metal is a powder having particle sizes between 10 and 300 microns.

7. The process of claim 1 wherein the temperature of the liquid hydrocarbon is between –60° C. and ambient temperature.

* * * * *